US009026470B2

(12) United States Patent
Nunes et al.

(10) Patent No.: US 9,026,470 B2
(45) Date of Patent: May 5, 2015

(54) CALCULATION OF A PRICE OF A SECURITY BASED ON VOLATILITY DETECTION

(75) Inventors: Adam Nunes, Brooklyn, NY (US); Charles Mack, South Amboy, NJ (US); Constantine Sokoloff, New York, NY (US)

(73) Assignee: The NASDAQ OMX Group, Inc., New York, NY (US)

( * ) Notice: Subject to any disclaimer, the term of this patent is extended or adjusted under 35 U.S.C. 154(b) by 998 days.

(21) Appl. No.: 12/255,154

(22) Filed: Oct. 21, 2008

(65) Prior Publication Data

US 2010/0100500 A1 Apr. 22, 2010

(51) Int. Cl.
*G06Q 40/00* (2012.01)
*G06Q 40/04* (2012.01)
*G06Q 40/06* (2012.01)
*G06Q 40/02* (2012.01)

(52) U.S. Cl.
CPC .............. *G06Q 40/04* (2013.01); *G06Q 40/025* (2013.01); *G06Q 40/02* (2013.01); *G06Q 40/00* (2013.01); *G06Q 40/06* (2013.01)

(58) Field of Classification Search
CPC ....... G06Q 40/00; G06Q 40/04; G06Q 40/06; G06Q 40/025; G06Q 40/02
USPC .................................................. 705/37, 36 R
See application file for complete search history.

(56) References Cited

U.S. PATENT DOCUMENTS

| | | | | |
|---|---|---|---|---|
| 6,505,174 | B1* | 1/2003 | Keiser et al. ................. | 705/36 R |
| 6,618,707 | B1* | 9/2003 | Gary ........................... | 705/36 R |
| 7,103,569 | B1* | 9/2006 | Groveman et al. ............. | 705/35 |
| 7,110,981 | B1* | 9/2006 | Sidikman et al. ............... | 705/43 |
| 7,827,087 | B2* | 11/2010 | Adatia ............................ | 705/37 |
| 8,140,425 | B2* | 3/2012 | Hiatt, Jr. ........................ | 705/37 |
| 2001/0042036 | A1* | 11/2001 | Sanders ......................... | 705/36 |
| 2002/0133449 | A1* | 9/2002 | Segal et al. .................... | 705/37 |
| 2002/0156716 | A1* | 10/2002 | Adatia ............................ | 705/37 |
| 2003/0126066 | A1* | 7/2003 | Nunes et al. .................... | 705/37 |
| 2005/0246261 | A1* | 11/2005 | Stevens et al. .................. | 705/37 |
| 2006/0031156 | A1* | 2/2006 | Noviello et al. ................ | 705/37 |
| 2008/0046356 | A1* | 2/2008 | Farrell et al. ................... | 705/37 |
| 2008/0059356 | A1* | 3/2008 | Brodsky et al. ................. | 705/37 |

OTHER PUBLICATIONS

Fong, W. (1993). Trading halts and the speed of adjustment of the market. (Order No. 9401260, The Ohio State University). ProQuest Dissertations and Theses, 101-101 p. Retrieved Apr. 15, 2014.*
Hauser, S., Kedar-Levy, H., Pilo, B., & Shurki, I. (2006). The effect of trading halts on the speed of price discovery. Journal of Financial Services Research, 29(1), 83-99. Retrieved Apr. 15, 2014.*

(Continued)

*Primary Examiner* — Kito R Robinson
(74) *Attorney, Agent, or Firm* — Nixon & Vanderhye P.C.

(57) ABSTRACT

Amongst other things, a computer implemented method for releasing a security for trading in a trading venue includes determining volatility in prices of quotations for a security before the security is released for trading; comparing the determined volatility to a volatility threshold; calculating an adjusted price of the quotations based on the output of the determined volatility in the prices; sending a message to release the security for trading, with the security having the adjusted price that is based on the outcome of comparing.

27 Claims, 6 Drawing Sheets

(56) References Cited

OTHER PUBLICATIONS

NASDAQ Stock Market LLC, Proposed Rule Change by NASDAQ Stock Market Pursuant to Rule 19B-4 under The Securities Exchange Act of 1934, File No. SR-2006-015, Amendment No. 1, pp. 1-45, Feb. 16, 2006.

NASDAQ Stock Market LLC, Proposed Rule Change by NASDAQ Stock Market Pursuant to Rule 19B-4 under The Securities Exchange Act of 1934, File No. SR-2007-004, Amendment No. 2, pp. 1-152, Dec. 13, 2007.

Securities and Exchange Commission, Proposed Rule Change by National Association of Securities Dealers, 2006, pp. 1-45.

Securities and Exchange Commission, Proposed Rule Change by National Association of Securities Dealers, 2006, pp. 1-36.

Securities and Exchange Commission, Proposed Rule Change by National Association of Securities Dealers, 2006, pp. 1-3.

\* cited by examiner

CALCULATION OF A PRICE OF A SECURITY BASED ON VOLATILITY DETECTION

BACKGROUND

Trading venues collect, aggregate and display trade information to market participants. Market participants initiate trades of securities by sending trade information to the electronic market on which the securities are traded. The trade information includes quotes and various types of orders such as continuous orders for execution during a market trading session of quotations. Before a security may be traded, either at the opening or after a halt in trading, the price of quotations at which the security is released for trading is determined. Various methods exist in which to calculate the price at which a security trades. These methods include an opening cross, closing cross and IPO cross. Before the security is released or opened for trading, volatility detection may be performed on the security's execution price, such as the opening cross execution price.

Volatility detection is performed by comparing the opening cross execution price to a volatility threshold. If the opening cross execution price is above the volatility threshold, the release of the security is delayed. In this case, volatility in the security's price is monitored over an additional period of time, although it need not be. At the end of this time period, the security is released only if volatility is less than the threshold, as described in *Securities and Exchange Commission Release No.* 34-53488; File No. SR-NASD-2006-105; Federal Register, Vol. 71, No. 54/Mar. 21, 2006 Notices. A disadvantage of this technique is that when volatility is detected above the threshold amount, trade resumption is delayed until the market price of quotations of the security drops to a non-volatile level.

SUMMARY

One or more of the above aspects of the invention may provide one or more of the following advantages.

An advantage of the volatility determination mechanism described herein is that when volatility exceeds the threshold, an alternate price that is below the threshold amount is calculated and the security resumes trading without delay.

In one aspect, a computer implemented method for releasing a security for trading in a trading venue includes determining volatility in prices of quotations for a security before the security is released for trading; comparing the determined volatility to a volatility threshold; calculating an adjusted price of the quotations based on the output of the determined volatility in the prices; sending a message to release the security for trading, with the security having the adjusted price that is based on the outcome of comparing; and selecting a volatility threshold appropriate for current conditions present in the trading venue.

Determining volatility in prices of quotations includes calculating a difference between the prices of quotations for the security and a reference price for the security. In some examples, the adjusted price is a last available order price that is below the volatility threshold. In other examples, the adjusted price is a maximum threshold price; a reference price; or the last disseminated price.

The computer implemented method also includes adjusting the volatility threshold based on market conditions and notifying market participant systems of the adjusted volatility threshold.

DETAILED DESCRIPTION

Figure 1:
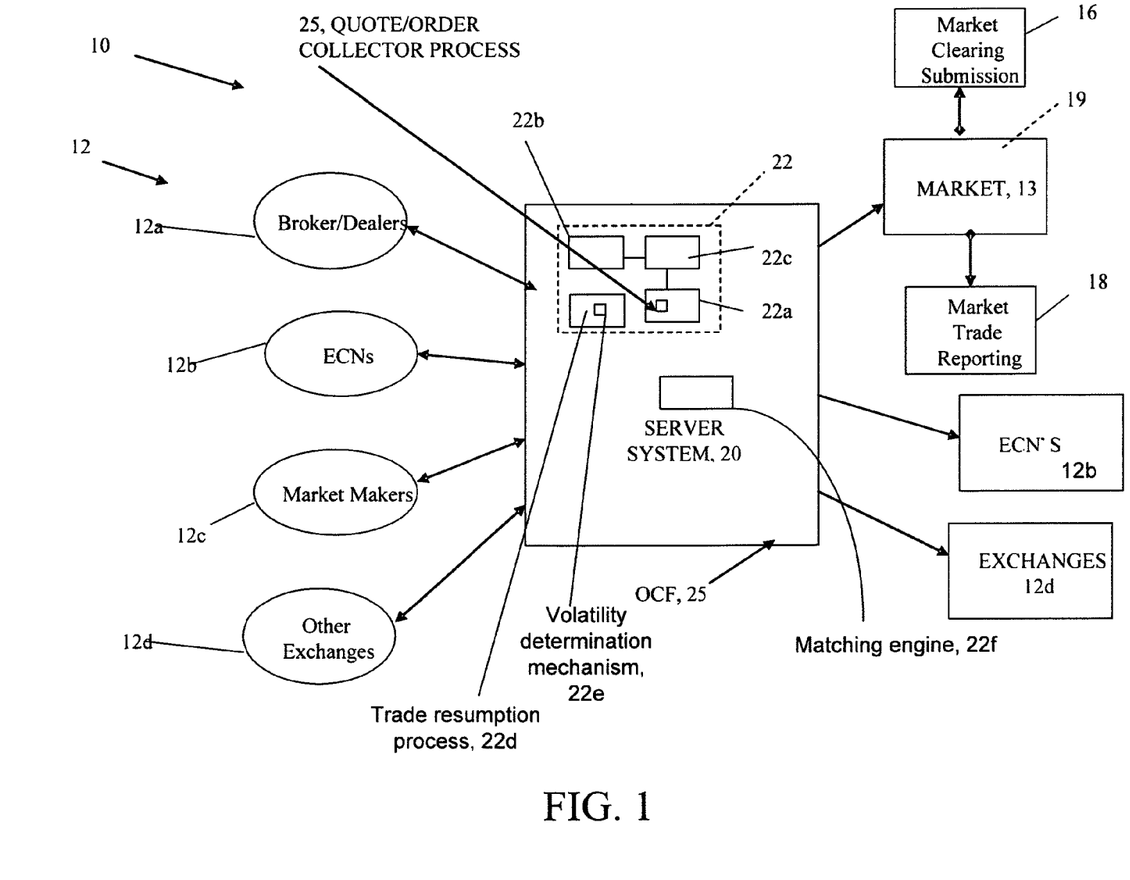
FIG. 1 is a block diagram of a market system.

Referring to FIG. 1, an electronic market 10 is shown as an example of a trading platform. Numerous other trading platforms may be used, including platforms that facilitate trading in markets and exchanges. The electronic market 10 includes client systems 12 that access a server system 20. In some examples, the client systems 12 are broker/dealer systems 12a, electronic communication networks (ECN's) 12b, market-maker(s) system(s) 12c, and other exchanges 12d. The client systems 12 include a processor, memory and a storage device, e.g., a client workstation or personal computer (all not shown) that can include a client process to enter quotes/orders into the electronic market systems to deliver executions or orders to a market that is coupled to a clearing system 16 and a reporting system 18. It also causes delivery of executions or routing of orders to the ECN's 12b, depending on the status of the ECN, and routing of orders to other markets and exchanges 12d. The server system 20 is comprised of one or preferably a plurality of server computers generally denoted as 22 including a processor 22a, main memory 22b and storage 22c. The storage system 22c includes quote/order collector process 25 that is executed in memory 22b. The storage system also includes instructions for resuming trading of securities, e.g., a "trade resumption process" 22d that determine a security's price, including the price at which a security opens, closes, is initially offered or resumes trading. This so called "trade resumption process" 22d includes a volatility determination mechanism 22e that detects whether the price at which a security is expected to resume trading ("expected resumption price") is below a price volatility threshold. If the expected resumption price is above the volatility threshold, then the trade resumption process 22d calculates an alternate resumption price.

A matching engine 22f that is part of the server 22 is also shown. The matching engine 22f matches, executes, etc. interest on either side of the market during trading of securities.

Trade Resumption

Before a security is released for trading, the server system 20 collects quotes and orders from the client systems 12. A trading price is a price at which a security trades (e.g., opens, closes or is released at). The execution price is determined by market forces, such as matching quotes and orders from client systems. Various market events cause volatility in the prices of quotations for a security throughout a trading day or over extended periods of time. To prevent securities from trading when the prices of quotations exhibit a large amount of volatility, the trade resumption process 22d and its volatility determination mechanism 22e detect volatility in the prices of quotations and calculate an alternate trading price when the volatility of prices of quotations exceeds a volatility threshold.

For example, in the Nasdaq Stock Market®, trading is allowed during a normal trading session (i.e., 9:30 a.m. to 4:00 p.m. EST). During this normal trading session, volatility determination mechanism 22e detects volatility in the prices of quotations for securities at various times throughout the day, including during an opening cross, closing cross, halt cross, initial public offering ("IPO") cross or any other time in which market officials determine that volatility detection should be performed.

EXAMPLES

In the example of an opening cross, as described in U.S. application Ser. No. 11/077,503 and incorporated herein by reference, the price at which the security opens for trading is determined by the trade resumption process 22d using the volatility determination mechanism 22e. To maintain stability in the markets, it is advantageous to measure volatility in the prices of quotations of a security during the opening cross. If the prices of quotations of a security exhibit a high amount of volatility, then the price at which the security executes ("the opening cross execution price") is a non-stable price. Therefore, if the prices of quotations exhibit a large amount of volatility, alternate prices of quotations are calculated. Based on this alternate calculation of opening cross quotations, an alternate opening cross execution price is calculated and the security opens at this alternate opening cross execution price. Other techniques for providing such an opening price could be used and those techniques and those prices could be substituted for the so called "opening cross execution price," as will be used below.

In the example of an IPO cross, the price at which the security is offered is determined using the trade resumption process 22d. Before the initial offering of the security, prices of quotations for the IPO issue are monitored. An IPO cross determines the price at which the IPO issues ("IPO issue price") and if the volatility determination mechanism 22e detects that the IPO issue price is unstable the mechanism calculates an alternate IPO issue price. This is done to ensure that once released, the IPO'ed security is stable and not subject to large amounts of price volatility in the prices of its quotations.

In the example of a halt cross, the price at which the security is released from a trading halt is determined using the trade resumption process 22d. Trading halts prevent large fluctuations in a security's price of quotations, allowing the security's price to remain stable during trading. For example, Federal Drug Administration (FDA) approval of a company's product causes volatility in the company's securities due to increased demand for the securities initially after announcement of the approval. As the market absorbs the announcement, demand for the security drops, causing the security's price to settle at a lower range. Therefore, trading will be halted during the period of volatility. However, before the security is released from the halt, the volatility determination mechanism 22e determines whether the halt cross execution price, as determined by prices of quotations for the security, is within the volatility threshold. If the halt cross execution price is not within the volatility threshold, then the trade resumption process 22d selects an alternate halt cross execution price. The security resumes trading at the alternate halt cross execution price.

In the example of a closing cross, as described in U.S. patent application Ser. No. 10/835,510 and incorporated herein by reference, the price at which a security closes is determined by the trade resumption process 22d. For example, at or shortly after market close (e.g., at 4:00:00 p.m.) a trading module performs a closing process. The closing process determines a closing price, a closing cross execution price, for each security based on the closing orders and continuous orders in the storage module at the close. To ensure stability in the markets, the volatility determination mechanism 22e detects volatility in the closing prices of quotations of a security and the trade resumption process 22d calculates an alternate closing cross execution price when the detected amount of volatility exceeds the volatility threshold.

Trade Resumption in an Opening Cross

In this example, a market opens for trading at 9:30 a.m. Prior to opening, the market begins disseminating an opening order imbalance indicator message to one or more data feeds. Although the opening cross will occur at 9:30 a.m., the opening order imbalance indicator message adds transparency to the market and encourages markets participants to add liquidity to the market prior to the open. At 9:30 a.m. the market opening cross process occurs. During the opening cross, a matching engine 22f identifies the price or prices at which a maximum number of shares would be executed. However, the opening cross process uses the price determined by the trade resumption process 22d. That is, the trade resumption process 22d determines if the security opens at the opening cross execution price or the alternate opening cross execution price.

Figure 2:
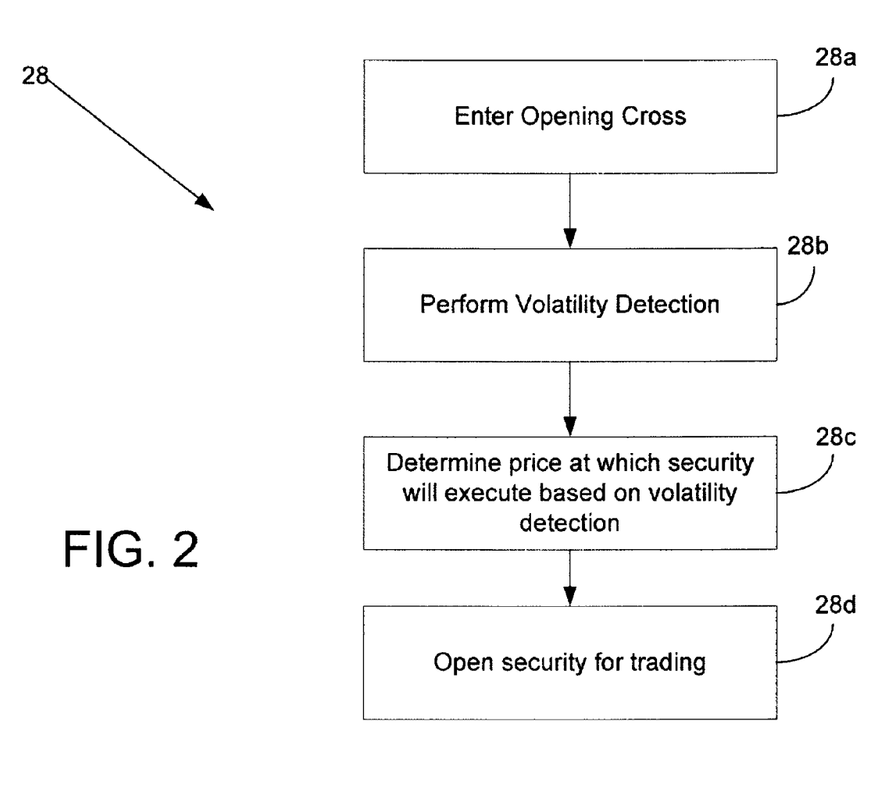
FIG. 2 is a block diagram of trade resumption during an opening cross.

Referring to FIG. 2, an example of the steps 28 included in the trade resumption process is shown. The opening cross is entered 28a and the trading platform calculates an opening cross execution price. In the next step 28b, volatility detection is performed using a volatility threshold. The volatility determination mechanism 22e determines whether the opening cross execution price is above the volatility threshold. Based on this volatility determination, step 28c determines the price at which the security executes. If the opening cross execution price is within the volatility threshold, the opening cross executes at the opening cross execution price. However, if the opening cross execution price is above the volatility threshold, the trade resumption process calculates an alternate opening cross execution price that is below the volatility threshold. In step 28d, the security is opened at the opening cross execution price or the alternate opening cross execution price.

Volatility Determination Mechanism

The trade resumption process 22d includes a volatility determination mechanism 22e to detect price fluctuations in quotations between prior opening cross execution prices and the opening cross execution price. The volatility determination mechanism also detects volatility between other types of prices, such as an indicative. For example, the volatility determination mechanism detects volatility between prior opening cross indicative prices and an opening cross indicative price. Therefore, as used herein, the term execution price includes indicative prices. In one particular example, a reference price, e.g., a calculated benchmark price, is selected that represents a relatively stable execution price below the volatility threshold. As an example, the reference price is the last disseminated price: the price at which the market has last indicated as the opening price for the security. However, several benchmark prices can be determined. In another example, one such benchmark is a benchmark value representing market conditions approximately five seconds prior to open, which is a volume weighted average price (VWAP) based on the market executions over the period from 9:29:55 to 9:30:00. In either case, the reference price acts as a proxy for the prior execution prices. The trade resumption process 22d detects and mitigates volatility in an opening cross execution price by comparing the opening cross execution price to the reference price. The trade resumption process 22d defines a volatility threshold, the amount of acceptable volatility between the opening cross execution price and the reference price. In some examples, the volatility threshold is a predetermined absolute price change, e.g., a specific dollar or fraction of a dollar amount (or other corresponding currency) or a percentage variance price change, e.g., a specific percentage. The determined threshold can be set by market officials in advance and communicated to members. For example, the announcement can occur an hour or less, e.g., an half an hour before the opening cross occurs. Other periods are possible such as a fixed threshold that is part of the rules of the market. In addition, these thresholds could be adjusted as market conditions warrant.

That is, the volatility price threshold is adjustable based on various market conditions such as large point drops in indices and overall market volatility. In one particular example, market officials adjust the volatility price threshold based on activity in the markets and a determined amount of acceptable volatility. In this example, if the price of a particular security regularly fluctuates between $15/share and $30/share, resulting in a $15 "fluctuation spread", market officials set the volatility price threshold at $16, if the security's regular fluctuations are deemed acceptable. However, if the security's regular fluctuations are not acceptable, then the market officials adjust the determined price threshold to be below the "fluctuation spread." In this example, the determined price threshold is set at $10/share, such that an alternate execution price is selected until the "fluctuation spread" drops to $10/share. The volatility threshold can be arrived at by various techniques. One such technique would involve market officials adjusting volatility threshold and/or the length of time used to determine volatility based on market conditions. Other techniques could involve algorithmic approaches. In some examples, after a price threshold adjustment is made, market participants are notified, allowing the market participants to gauge the relative stability of stock before the stock opens. In one example, market participants are notified using email alert systems. However, the amount of the price threshold adjustment need not be listed in the email. Instead, exchange systems could communicate the threshold adjustment directly to market participant system using a data feed such as the imbalance indicator feeds.

Figure 3:
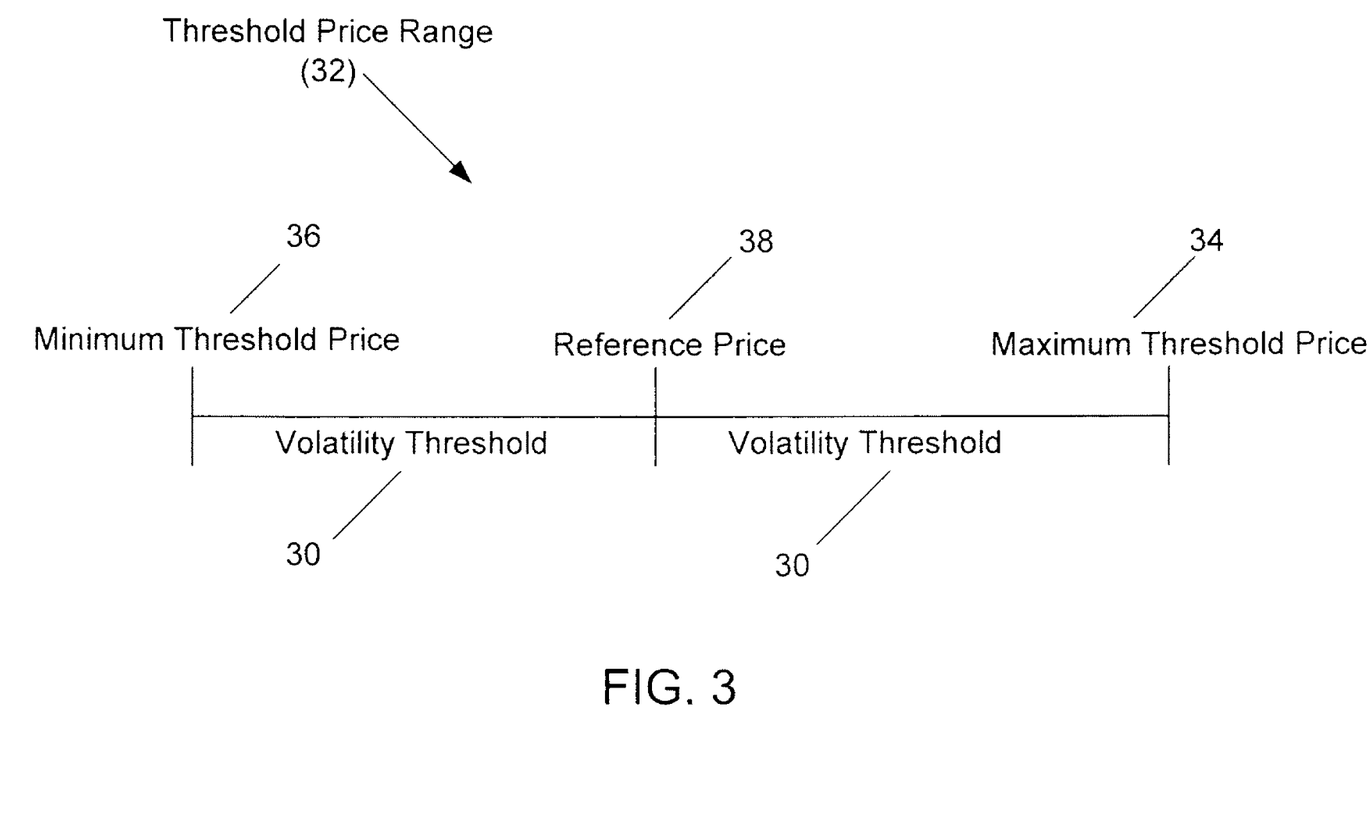
FIG. 3 is a diagram of a threshold price range.

Referring to FIG. 3, the trade resumption process 22d determines a threshold price range 32 based on the volatility threshold 30. The threshold price range 32 is a range of opening cross execution prices with volatility levels equal to or less than the volatility threshold. The upper end of the range is referred to as the maximum threshold price 34. The lower end of the range is referred to as the minimum threshold price 36.

The maximum threshold price 34 is calculated by adding the volatility threshold 30 to the reference price 38. The minimum threshold price 36 is calculated by subtracting the volatility threshold 30 from the reference price 38. Opening cross execution prices lying between the minimum threshold price 36 and the maximum threshold price 34 exhibit an acceptable level of volatility.

Prior to release, the volatility determination mechanism 22e calculates whether the opening cross execution price exhibits an acceptable amount of volatility. This calculation of volatility may be accomplished in various ways including (a) comparing the opening cross execution price to the range of stable prices or (b) calculating an opening cross execution price differential. In a first example, the volatility determination mechanism compares the opening cross execution price to the threshold price range 32 to determine whether the opening cross execution price is within the threshold price range 32. If the opening cross execution price is within the threshold price range 32, then the security is released at the opening cross execution price. However, if the opening cross execution price is not within the threshold price range 32, an alternate opening cross execution price is selected as discussed below. In other instances, the opening can be delayed using conventional approaches if the alternative price does not satisfy the crossing mechanism and is above the volatility threshold, as described in U.S. patent application Ser. No. 12/035,748.

Figure 4:
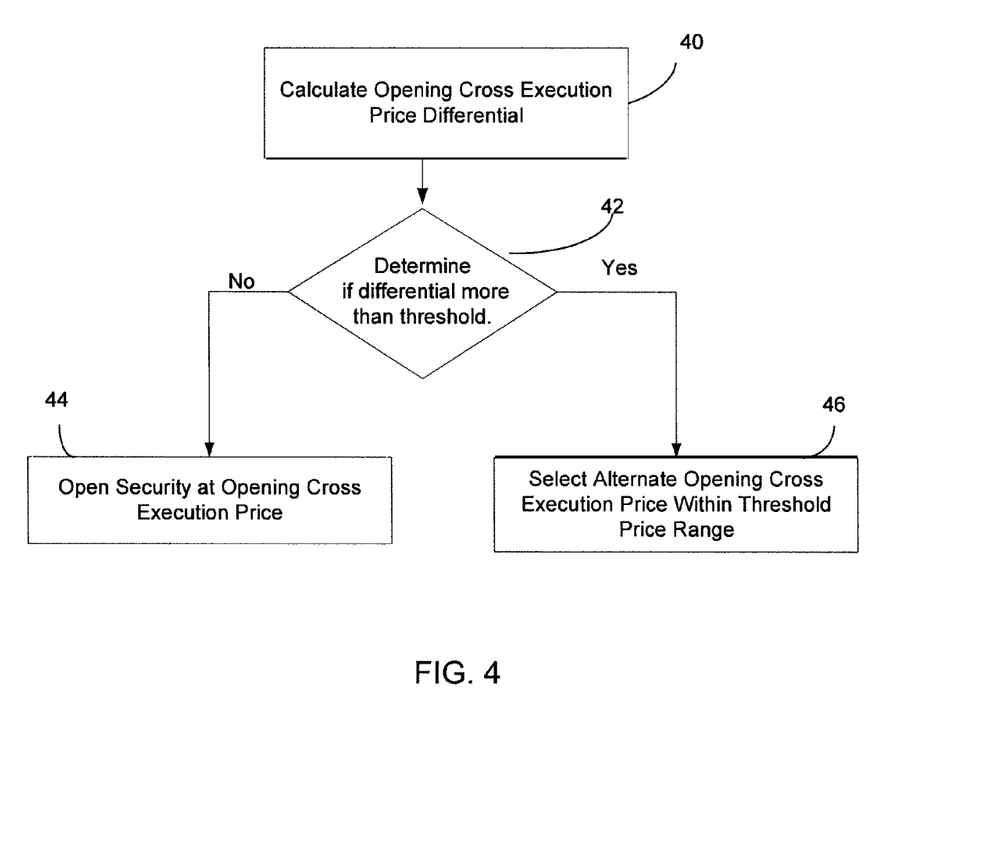
FIG. 4 is a block diagram of a volatility determination process.

In a second example, referring to FIG. 4, the volatility determination mechanism detects volatility in the opening cross execution price by calculating a differential ("an opening cross execution price differential" 40) between the opening cross execution price and the reference price. The opening cross execution price differential 40 is calculated as a percentage value or as an absolute value.

The opening cross execution price differential 40 is compared to the volatility threshold 30, because the platform uses the opening cross execution price differential 40 as a volatility indicator. The larger the absolute value of the opening cross execution price differential 40, the larger the amount of volatility, because a large opening cross execution price differential indicates a large spread between the opening cross execution price and the reference price.

If the opening cross execution price differential is determined 42 to be less than the volatility threshold 42, then the volatility level is acceptable and the security is opened at the opening cross execution price 44. However, if the opening cross execution price differential is more than the volatility threshold 42, then the trade resumption process determines an alternate execution price that lies within the threshold price range 46.

The alternate opening cross execution price is calculated based on various factors, such as the supply or the demand on the opposite side of an imbalance or the price level at which orders are available from clients, as discussed in more detail below. For example, if execution price volatility is caused by a buy-side imbalance, then quotes from sell side clients influence the alternate execution price.

In other examples, the alternate execution price is the price that maximizes the number of matches between buy and sell orders, the price that minimizes an imbalance, or the price that is the closest to the last dissemination price. In general, the alternate execution price is determined in a manner that accurately reflects market conditions. In some instances, as will be discussed below, determining execution prices that accurately reflects market conditions may not be possible. The trade resumption process 22d selects the alternate execution price automatically prior to execution of the opening cross and all orders that are executable are executed.

Various other ways for calculating the alternate opening cross execution price also exist.

Figure 5:
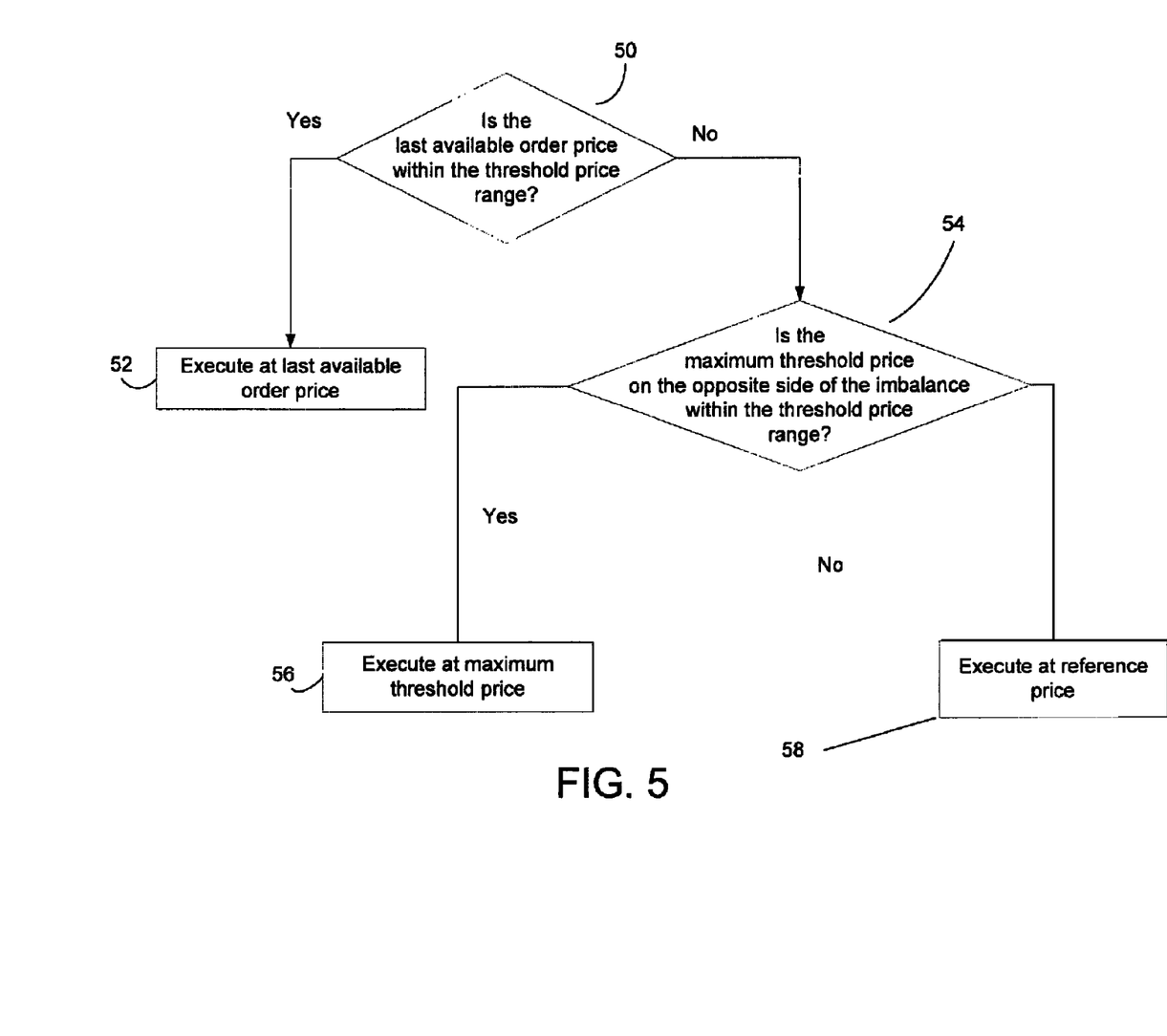
FIG. 5 is a block diagram of a price selection process.

Referring to FIG. 5, the trade resumption process 22d determines if there exists a last available order price on the opposite side of the imbalance within the volatility threshold price range 50. If there is such a last available order price, then the alternate opening cross execution price is set at the price of this last available order 52, because this last available order price accurately reflects the market conditions. Additionally, the selection of a price on the opposite side of an imbalance helps to alleviate the imbalance.

Example 1

Last Available Order Price

In this example, the threshold price range is $10-$11 and a book of orders includes the following:

TABLE 1

| Buy Size | Buy Price | Sell Price | Sell Size |
|---|---|---|---|
| 2000 | 15.00 | 10.00 | 500 |
| 1000 | 12.00 | 10.50 | 400 |
|  |  | 10.75 | 1000 |

The opening cross execution price is $15.00, because this is the price at which a maximum number of shares are bought and sold. However, because the $15.00 opening cross execution price is outside the threshold price range of $10-$11, an alternate cross execution price is selected. In this example, the alternate cross execution price is $10.75, because this is the last available order price on the opposite side of the imbalance and the price that maximizes the number of matches between sell and buy orders.

If no such last available order price exists, then the trade resumption process 22d selects the maximum volatility threshold price on the opposite side of the imbalance, because the maximum threshold price still accurately reflects market conditions, as discussed in Example 2 below.

Example 2

Maximum Volatility Threshold Price

Table 2 below represents a book of buy and sell orders:

TABLE 2

| Buy Size | Buy Price | Sell Price | Sell Size |
|---|---|---|---|
| 2000 | 15.00 | 10.00 | 500 |
| 1000 | 10.99 | 10.50 | 400 |
|  |  | 11.50 | 1000 |

In this example, the opening cross execution price is $5.00, because this is the price that matches the largest number of buy orders with sell orders. However, the $15.00 opening cross execution price is outside of the $10-$11 volatility threshold price range. Therefore, the trade resumption process selects an alternate cross execution price. Because the last available order price on the opposite side of the imbalance is $11.50 and thus still outside the volatility threshold price range, the trade resumption process selects the maximum volatility threshold price of $11.00 as the alternate cross execution price. This maximum volatility threshold price allows the sellers to realize the most price improvement, while keeping the opening cross execution price close to the naturally occurring execution price of $15.00 and also within the volatility threshold price range.

In some examples, the trade resumption process 22d selects the reference price as the alternate opening cross execution price 58, because either the last available order price is the reference price or the reference price more accurately reflects market conditions than the maximum threshold price. In other examples, the reference price may not reflect the current market status, because it is a non-current price. However, the reference price accurately reflects the security's value.

Example 3

Reference Price

A book of buy and sell orders initially include the following orders:

TABLE 3

| Buy Size | Buy Price | Sell Price | Sell Size |
|---|---|---|---|
| 1000 | 10.50 | 10 | 500 |
|  |  | 10.50 | 600 |

In this Example 3 book, the opening cross execution price is $10.50. If the last disseminated price is chosen as the reference price, then the reference price is $10.50. When a second order is received to buy 2000 shares for $15.00, the book is updated as follows:

TABLE 4

| Buy Size | Buy Price | Sell Price | Sell Size |
|---|---|---|---|
| 2000 | 15.00 | 10 | 500 |
| 1000 | 10.50 | 10.50 | 600 |

With the addition of this second order, the opening cross execution price becomes $15.00. Because this opening cross execution price is outside the volatility threshold range, the trade resumption process selects an alternate cross execution price. In this example, the trade resumption process selects the reference price of $10.50, because this reference price maintains the market at a stable price. However, the trade resumption process could instead choose the maximum volatility threshold price of $11.00 as the alternate cross execution price. See example 2. However, in this case, the reference price of $10.50 more accurately reflects current market activity because the reference price is also the last available order price on the sell side.

After the alternate cross execution price is selected, the security is opened at the alternate opening cross execution price, without delaying the opening cross. One of the advantages of this system includes the continuous trading of a security, even during times of high-volatility. Instead of delaying the trading or release of a security until volatility has stabilized or decreased, the trade resumption process seamlessly and automatically selects an alternate price that is below the volatility threshold.

Figure 6:
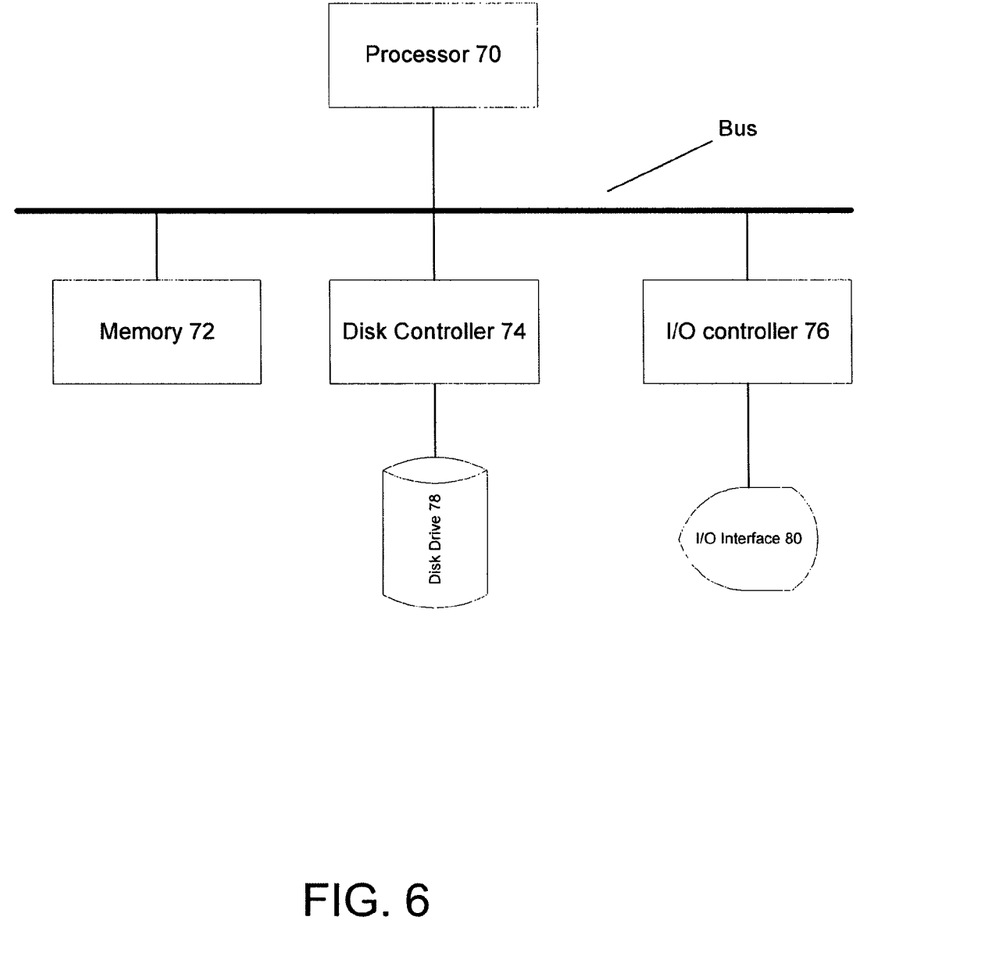
FIG. 6 is a diagram of a computing system that implements a method of detecting volatility.

Referring to FIG. 6, a computing system that implements volatility detection includes a processor 70, memory 72, disk controller 74 and an input/output (I/O) controller 76 all linked by a common bus. In some examples, the computing system also includes a disk drive 78, a monitor or other communication output device or interface 80 and a keyboard or other communication input device or interface 80.

A number of embodiments of the invention have been described. Nevertheless, it will be understood that various modifications may be made without departing from the spirit and scope of the invention. Accordingly, other embodiments are within the scope of the following claims. It is to be understood that using volatility detection as described herein occurs across different types of markets, such as securities, bonds, derivatives, futures, options, equities and commodities markets and other financial markets. By derivatives are meant financial instruments whose values depend on values of other underlying financial instruments. Examples of derivatives include but are not limited to futures, forwards, options and swaps. Additionally, the examples described herein are applicable to stock and bonds, as well as to the release of a security from an IPO or a trading halt and the opening of a security and to any other situation in which volatility detection may be performed. An advantage of the volatility determination mechanism described herein is that when volatility exceeds the threshold, an alternate price that is below the threshold amount is calculated and that price can be used to resume trading in the security trading without delaying such trading, as in the conventional approach.

What is claimed is:

1. A computer implemented method for releasing a data item having an identifier for transaction processing in a data transaction processing system in which data items are transacted by a hardware matching processor that matches electronic data transaction request messages for the same one of the data items based on multiple transaction parameters from different client computers over a data communication network, the method comprising:

after either a previously imposed halt of the hardware matching processor or prior to an initial processing by the hardware matching processor to process electronic data transaction request messages for the data item received over a data communication network from different client computers, determining by one or more hardware data processors a volatility in one of the transaction matching parameters for the data item received from the client computers before the hardware matching processor is permitted to process the data transaction messages for the data item received over a data communication network from different client computers from either the previously imposed halt of the hardware matching processor or the initial processing of electronic data transaction request messages for the data item by the matching processor;

comparing by the one or more hardware volatility processors the determined volatility of the one transaction matching paramter of the data item to a volatility threshold established for the data item;

calculating by the one or more hardware volatility processors an adjusted one transaction matching parameter of the data item based on the output of the determined volatility in the one transaction matching paramter; and sending by the one or more hardware volatility processors to the hardware matching processor an electronic data message to release the hardware matching processor to process electronic data transaction request messages for the data item received over a data communication network from different client computers, with data item having the adjusted one transaction matching parameter that is based on the outcome of comparing.

2. The method of claim 1, further comprising:
selecting a volatility threshold appropriate for current conditions present in the data transaction processing system.

3. The method of claim 1, wherein determining volatility in the one transaction matching parameter for the data item comprises:
calculating a difference between the one transaction matching parameter of the data item and a reference transaction matching parameter for the data item.

4. The method of claim 1, wherein the adjusted one transaction matching paramteter of the data item is a last available order one transaction matching paramter of the data item that is below the volatility threshold.

5. The method of claim 1, wherein the adjusted one transaction matching parameter of the data item is a maximum threshold for the one transaction matching parameter of the data item.

6. The method of claim 1, wherein the one or more hardware volatility processors determine the volatility in the one transaction matching parameter of the data item before the initial processing by the hardware matching processor to process electronic data transaction request messages for the data item received over a data communication network.

7. The method of claim 1, wherein the adjusted one transaction matching parameter of the data item is the last disseminated one transaction matching parameter of the data item or a reference one transaction matching parameter of the data item.

8. The method of claim 1, further comprising adjusting the volatility threshold based on market conditions.

9. The method of claim 8, further comprising notifying market participant systems of the adjusted volatility threshold.

10. A computer program product embodied on a computer-readable medium for releasing a data item having a identifier for transaction processing in a data transaction processing system in which data items are transacted by a hardware matching processor that matches electronic data transaction request messages for the same one of the data items based on multiple transaction matching parameters from different client computers over a data communication network, the computer program product comprising instructions for causing the date transaction processing system to:

after either a previously imposed halt of the hardware matching processor or prior to an initial processing by the hardware matching processor to process electronic data transaction request messages for the data item received over a data communication network from different client computers, determine by one or more hardware data processors a volatility in one of the transaction matching parameters for the data item received from the client computers before the hardware matching processor is permitted to process the data transaction messages for the data item received over a data communication network from different client computers from either the previously imposed halt of the hardware matching processor or the initial processing of electronic data transaction request messages for the data item by the matching processor;

compare by the one or more hardware volatility processors the determined volatility of the one transaction matching parameter of the data item to a volatility threshold established for the data item;

calculate by the one or more hardware volatility processors an adjusted one transaction matching parameter of the data item based on the output of the determined volatility in the one transaction matching parameter; and send by the one or more hardware volatility processors to the hardware matching processor an electronic data message to release the hardware matching processor to process electronic data transaction request messages for the data item received over a data communication network from different client computers, with data item having the adjusted one transaction matching parameter that is based on the outcome of comparing.

11. The computer program product of claim 10, further comprising instructions for causing the one or more hardware volatility processors to:
select a volatility threshold appropriate for current conditions present in the data transaction processing system.

12. The computer program product of claim 10, wherein instructions for causing the one or more hardware volatility processors to determine volatility further comprise instructions to:
calculate a difference between the one transaction matching parameter of the data item and a reference transaction matching parameter for the data item.

13. The computer program product of claim 10, wherein the adjusted one transaction matching parameter of the data item is a last available order one transaction matching parameter of the data item that is below the volatility threshold.

14. The computer program product of claim 10, wherein the adjusted one transaction matching parameter of the data item is a maximum threshold for the one transaction matching parameter of the data item.

15. The computer program product of claim 10, farther comprising instructions for causing the one or more hardware volatility processor to:

detrmine the volatility in the one transaction matching parameter of the data item before the initial processing by the hardware matching processor to process electronic data transaction request messages for the data item received over a data communication network.

16. The computer program product of claim 10, wherein the adjusted one transaction matching parameter of the data item is the last disseminated one transaction matching parameter of the data item or a reference one transaction matching parameter of the data item.

17. The computer program product of claim 10, further comprising instructions for causing the data transaction processing system to:

adjust the volatility threshold based on market conditions.

18. The computer program product of claim 17, further comprising instructions for causing the data transaction processing system to:

notify market participant systems of the adjusted volatility threshold.

19. An apparatus for releasing a data item having an identifier for transaction processing in a data transaction processing system in which data items are transacted by a hardware matching processor that matches electronic data transaction request messages for the same one of the data items based on multiple transaction matching parameters from different client computers over a data communication network, the apparatus comprising:

the hardware matching processor;

a hardware processing unit in data communication with the a hardware matching processor, wherein the hardware processing unit is configured to:

after either a previously imposed halt of the hardware matching processor or prior to an initial processing by the hardware matching processor to process electronic data transaction request messages for the data item received over a data communication network from different client computers, determine a volatility in one of the transaction matching parameters for the data item received from the client computers before the hardware matching processor is permitted to process the data transaction messages for the data item received over a data communication network from different client computers from either the previously imposed halt of the matching processor or the initial processing of electronic data transaction request messages for the data item by the hardware matching processor;

compare the determined volatility of the one transaction matching parameter of the data item to a volatility threshold established for the data item;

calculate an adjusted one transaction matching parameter of the data item based on the output of the determined volatility in the one transaction matching parameter; and send a message to the hardware matching processor an electronic data message to release matching processor to process electronic data transaction request messages for the data item received over a data communication network from different client computers, with data item having the adjusted one transaction matching parameter that is based on the outcome of comparing.

20. The apparatus of claim 19, wherein the hardware processing unit is further configured to:

select a volatility threshold appropriate for current conditions present in the data transaction processing system.

21. The apparatus of claim 19, wherein the hardware processing unit is configured to:

calculate a difference between the one transaction matching parameter for the data item and a reference one transaction matching parameter for the data item.

22. The apparatus of claim 19, wherein the adjusted one transaction matching parameter for the data item is a last available one transaction matching parameter for the data item that is below the volatility threshold.

23. The apparatus of claim 19, wherein the adjusted one transaction matching parameter of the data item is a maximum threshold.

24. The apparatus of claim 19, wherein the hardware processing unit is configured to determine the volatility in the one transaction matching parameter for the data item before the initial processing by the hardware matching processor to process electronic data transaction request messages for the data item received over a data communication network.

25. The apparatus of claim 19, wherein the adjusted one transaction matching parameter of the data item is the last disseminated one transaction matching parameter of the data item or a reference one transaction matching parameter of the data item.

26. The apparatus of claim 19, wherein the hardware processing unit is further configured to adjust the volatility threshold based on market conditions.

27. The apparatus of claim 26, wherein the hardware processing unit is further configured to notify market participant systems of the adjusted volatility threshold.

* * * * *

UNITED STATES PATENT AND TRADEMARK OFFICE
CERTIFICATE OF CORRECTION

| | | |
|---|---|---|
| PATENT NO. | : 9,026,470 B2 | Page 1 of 1 |
| APPLICATION NO. | : 12/255154 | |
| DATED | : May 5, 2015 | |
| INVENTOR(S) | : Nunes et al. | |

It is certified that error appears in the above-identified patent and that said Letters Patent is hereby corrected as shown below:

In the Claims

In Claim 1, column 9, line 3, delete "the same one" and insert --a same one--

In Claim 1, column 9, line 22, insert --hardware-- before "matching"

In Claim 1, column 9, lines 23, 27, and 31, delete "volatility" and insert --data--

In Claim 1, column 9, line 36, before "data item" insert --the--

In Claim 4, column 9, line 51, delete "order"

In Claim 7, column 9, lines 64-65, delete "the last" and insert --a last--

In Claim 10, column 10, lines 30-31, insert --hardware-- before "matching"

In Claim 10, column 10, lines 32, 36, and 40, delete "volatility" and insert --data--

In Claim 10, column 10, line 45, insert --the-- before "data"

In Claim 11, column 10, line 50, delete "volatility" and insert --data--

In Claim 12, column 10, line 54, delete "volatility" and insert --data--

In Claim 13, column 10, line 62, delete "order"

In Claim 15, column 11, line 3, delete "volatility" and insert --data--

In Claim 15, column 11, line 4, delete "detrmine" and insert --determine--

In Claim 16, column 11, line 11, delete "the last" and insert --a last--

In Claim 19, column 11, line 27, delete "the same" and insert --a same--

In Claim 19, column 11, line 47, insert --hardware-- before "matching"

In Claim 19, column 12, line 5, delete "the output of"

In Claim 19, column 12, line 7, delete "a message"

In Claim 19, column 12, line 8, insert --the hardware-- before "matching"

In Claim 19, column 12, line 11, insert --the-- before "data"

In Claim 25, column 12, line 38, delete "the last" and insert --a last--

Signed and Sealed this
Twenty-fifth Day of August, 2015

Michelle K. Lee
*Director of the United States Patent and Trademark Office*